US007844861B2

(12) United States Patent
Hegarty et al.

(10) Patent No.: US 7,844,861 B2
(45) Date of Patent: Nov. 30, 2010

(54) AUTOMATIC GENERATION OF TEST CASES FROM ERROR DATA

(75) Inventors: Orla Hegarty, Mountain View, CA (US); Noriko Hosoi, Palo Alto, CA (US)

(73) Assignee: Red Hat, Inc., Raleigh, NC (US)

( * ) Notice: Subject to any disclaimer, the term of this patent is extended or adjusted under 35 U.S.C. 154(b) by 393 days.

(21) Appl. No.: 11/605,782

(22) Filed: Nov. 27, 2006

(65) Prior Publication Data

US 2008/0126880 A1    May 29, 2008

(51) Int. Cl.
G06F 11/00 (2006.01)
(52) U.S. Cl. ...................................................... 714/46
(58) Field of Classification Search .................... 714/46
See application file for complete search history.

(56) References Cited

U.S. PATENT DOCUMENTS

| | | | | |
|---|---|---|---|---|
| 6,202,174 | B1 * | 3/2001 | Lee et al. ....................... | 714/38 |
| 6,418,543 | B1 * | 7/2002 | Goli et al. ...................... | 714/38 |
| 6,601,018 | B1 * | 7/2003 | Logan .......................... | 702/186 |
| 2003/0041052 | A1 * | 2/2003 | Gajda et al. ..................... | 707/3 |
| 2003/0086536 | A1 * | 5/2003 | Salzberg et al. .......... | 379/15.02 |
| 2004/0249914 | A1 * | 12/2004 | Flocken et al. .............. | 709/223 |
| 2004/0250220 | A1 * | 12/2004 | Kalenius ..................... | 715/864 |
| 2005/0075831 | A1 * | 4/2005 | Ilic ............................. | 702/179 |
| 2006/0161414 | A1 * | 7/2006 | Carignano et al. ............ | 703/17 |
| 2006/0168569 | A1 * | 7/2006 | Smith et al. .................. | 717/124 |
| 2006/0259499 | A1 * | 11/2006 | Moulckers et al. .......... | 707/100 |
| 2008/0072187 | A1 * | 3/2008 | Drasny et al. ................... | 716/4 |

OTHER PUBLICATIONS lift:LIFT, Project Home. https://lift.dev.java.net/ Sep. 28, 2007. 3 pages.
lift: LIFT—Introduction, https://lift.dev.java.net/introduction.html. Sep. 28, 2007. 3 pages.
Bugzilla Main Page. https://bugzilla.redhat.com/bugzilla/index.cgi. Oct. 23, 2007. 3 pages.
Bug 211652: crash generates floating point assist faults on ia64.. https://bugzilla.redhat.com/bugzilla/show_bug.cgi?id+211652. Oct. 23, 2007. 5 pages.

* cited by examiner

*Primary Examiner*—Scott T Baderman
*Assistant Examiner*—Yair Leibovich
(74) *Attorney, Agent, or Firm*—Blakely, Sokoloff, Taylor & Zafman LLP

(57) ABSTRACT

Some embodiments of a method and apparatus for automatically generating test cases from error data have been presented. In one embodiment, the method includes providing a graphical user interface (GUI) to allow a user to submit a report of an error in a program. The report may be partially written in a natural language. Further, the method may include receiving the report from the user via the GUI and processing the report to generate a test case to reproduce the error.

21 Claims, 8 Drawing Sheets

Sample Code  /—300

I. Raw data in the Bug Tracking System
=======================================
[Description]
Description of problem:
Range search "(&(A < val_A)(B > val_B))" failed to return the matching results.

Steps to Reproduce:
1. import an attached ldiffile (id=1111)
2. search with the filter "(&(sn>0000)(givenname<FFFF))"

Actual results:
search return count = 0

Expected results:
search return count = 3

Figure 3A

II. Converted XML
=====================
<testcase id="12345" problem="Range search \"(&(A < val_A)(B > val_B))\" failed to return the matching results.">
<steps>
<step keyword="import" keyword="attached" keyword="ldiffile" attachment="id=1111" />
<step keyword="search" keyword="filter" string="(&(sn>0000)(givenname<FFFF))" />
</steps>
<actual_result search_return_count=0 />
<expected_result search_return_count=3 />
</testcase>

FIG. 3B

III. Generated executable script
==================================

```
bug12345
{
  echo "Test case: bug12345"
  echo "Range search \"(&(A < val_A)(B > val_B))\" failed to return the matching results."

#import attached ldiffile id=1111
  myldif1=${MY_TMP_DIR}/bug12345_1.ldif
  wget https://bugzilla.redhat.com/bugzilla/attachment.cgi?id=1111 -O $myldif1
  StopSlapd; ldif2db -n userRoot -i $myldif1; StartSlapd search filter "(&(sn>0000)(givenname<FFFF))"
  myfilter1="(&(sn>0000)(givenname<FFFF))"
  mysuffix1=GetSuffix $myldif1
  mycnt1=CountResult `ldapsearch -D ${DEFAULTUSER} -w ${DEFAULTUSERPW} -b $mysuffix1 $myfilter1 dn` results
  actual_result=0
  expected_result=3

#Check with actual_result
  if [ $mycnt1 -eq $actual_result ]; then
    echo "bug12345 occured."
    echo "actual_result is $mycnt1; expected_result is $expected_result"
    set FAIL
  fi

#Check with expected_result
  if [ $mycnt1 -eq $expected_result]; then
    echo "bug12345 is fixed."
    echo "actual_result is $mycnt1; expected_result is $expected_result"
    set PASS
  fi return
}
```

AUTOMATIC GENERATION OF TEST CASES FROM ERROR DATA

TECHNICAL FIELD

Embodiments of the present invention relate to software development, and more specifically to automatic generation of test cases from error data.

BACKGROUND

One important phase in software development is testing. Testing of a program helps to uncover errors in the program, which may be revised accordingly to correct the error. Then the program may be tested again to determine if the errors have been corrected.

One common way to test a program is to execute a test program against that program. This test program may be a series of operations or instructions, some or all of which may run manually or automatically. Typically, a test case is developed based on one or more errors identified in a program such that by executing the program in the test case, a software developer may check if the errors identified have been corrected. A test case in general includes a set of instructions and/or inputs to the program to cause the program to perform a predetermined task and/or to output a predetermined result. If the program performs the predetermined task and produce the predetermined result as intended, then the program passes the test. If the program does not perform the predetermined task as intended (e.g., the program outputs a different result, execution of the program stalls, etc.), then the program fails the test.

Conventionally, software developers have to compose the test cases themselves in computer-programming languages. Recently, some developer interface in one conventional integrated development environment (IDE) for software has been provided to allow software developers to compose test cases via a graphical user interface (GUI), thus, making test case composition easier for software developers. However, software developers still need at least some knowledge of the specific computer-programming language (e.g., Java) usable in the IDE in order to be able to compose test cases via the GUI.

BRIEF DESCRIPTION OF THE DRAWINGS

The present invention is illustrated by way of example, and not by way of limitation, in the figures of the accompanying drawings and in which:

FIG. 3A illustrates an exemplary embodiment of an error report in a natural language.

FIG. 3B illustrates an exemplary embodiment of a parsed error report.

FIG. 3C illustrates an exemplary embodiment of a proposed test case generated from an error report.

DETAILED DESCRIPTION

Figure 1:
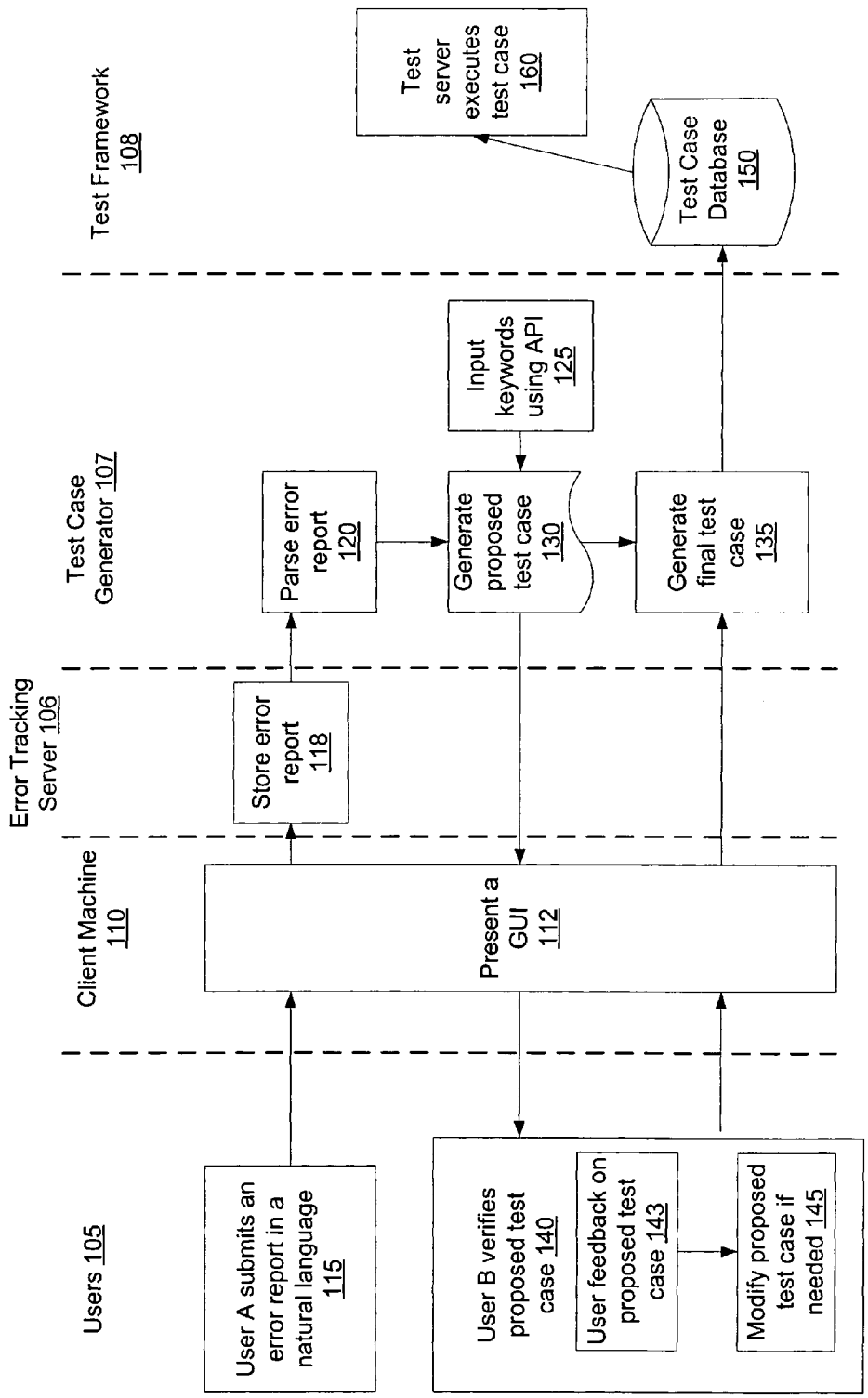
FIG. 1 illustrates a flow diagram of one embodiment of a process to automatically generate test cases from error data.

Described herein is a method and apparatus for automatically generating test cases from error data. In one embodiment, a graphical user interface (GUI) is provided to allow a user to submit a report of an error in a program. The report may be partially written in a natural language, and thus, may be non-programming language specific. Then the report may be processed to generate a test case to reproduce the error.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the operations described herein. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a flow diagram of one embodiment of a process to automatically generate test cases from error data. The process may be performed by processing logic that may comprise hardware (e.g., circuitry, dedicated logic, programmable logic, microcode, etc.), software (such as instructions run on a processing device), or a combination thereof. In one embodiment, at least a portion of the process is performed at a test case generator 107 with inputs from users 105, which may be submitted via a client machine 110. The client machine 110 may be coupled to an error tracker server 106. The error tracking server 106 may be further coupled to the test case generator 107, which is further coupled to a test framework 108 including a test server and a test case database 150. Note that the users 105 may include multiple persons, where different persons (e.g., an error reporter, a test case developer, a tester, etc.) may perform the user operations described below in some embodiments.

In some embodiments, the client machine 110 presents a GUI at block 112 to receive a report of an error in a program, which is also referred to as an error report. A program as used herein refers to a set of one or more instructions, routines, modules, libraries, or the like, which, when executed by a processing device (e.g., a central processing unit, a processor, a processing core, etc.), cause the processing device to perform some predetermined action and/or tasks. Further, an error in a program in the current description generally refers to a fault or a mistake in the program that prevents the program from working as intended (e.g., the program stalls during execution, the program outputs an unexpected result, etc.). The error in the program is also commonly referred to as a "bug." The GUI presented on the client machine 110 may be generated by the error tracking server 106, the test case generator 107, and/or the test framework 108.

In some embodiments, the GUI includes a display having a form or a template with one or more editable fields for the user to input information about the error. Alternatively, the GUI may include multiple displays or pages presented via one or more windows. Further, the GUI may be presented to one of the users 105 (hereinafter, "user A") via a network access application running on the client machine 110, such as an Internet browser, an electronic mail engine, etc.

Via the GUI, user A may submit the error report in a natural language at block 115. A natural language as used herein generally refers to a language written or spoken by humans for general-purpose communication, as opposed to constructs, such as computer-programming languages, machine-readable or machine-executable languages, or the languages used in the study of formal logic, such as mathematical logic. Some examples of a natural language include English, German, French, Russian, Japanese, Chinese, etc. In one embodiment, the error report may be in a pseudo-natural language, which may include one or more words and/or phrases in a natural language, as well as logical and/or mathematical constructs (e.g., "sn>0000," "givename<=FFFF," etc.). In other words, the error report may be partially written in a natural language. One exemplary embodiment of an error report is shown in FIG. 3A. Referring to FIG. 3A, the error report 300 is partially written in English. Since the error report is in a natural language and/or a pseudo-natural language, rather than in any specific computer-programming language, the error report is non-programming language specific. Moreover, user A may not need to have any knowledge of a specific computer-programming language in order to compose and/or submit the error report.

After the error report has been submitted via the GUI at the client machine 110, the client machine 110 may transfer the error report to the error tracking server 106. The error tracking server 106 may store the error report at block 1118. In some embodiments, the test case generator 107 retrieves the error report from the error tracking server 106 and parses the error report at block 120. One exemplary embodiment of a parsed error report is shown in FIG. 3B. Referring to FIG. 3B, the parsed error report 310 is in extensible markup language (XML).

Referring back to FIG. 1, the test case generator 107 may input predetermined keywords using an application programming interface (API) at block 125. For instance, the test case generator 107 may import a file containing a collection of keywords using the API. Further, there may be a different set of keywords for each natural language supported by the test case generator 107. Using the parsed error report and the keywords, the test case generator 107 may generate a proposed test case at block 130. In some embodiments, the test case generator 107 searches the error report to find the keywords in the error report, if any. Based on the keyword(s) found in the parsed error report, the test case generator 107 may generate the proposed test case by adding some predetermined instructions and/or inputs to the test case. In some embodiments, the proposed test case is written in a computer-programming language or a script language generally readable and/or understandable by one skilled in the software programming art. Alternatively, the proposed test case may be written in machine-executable test code. One exemplary embodiment of a proposed test case generated is shown in FIG. 3C. Referring to FIG. 3C, the proposed test case generated 320 is in UNIX shell script.

Referring back to FIG. 1, the test case generator 107 may send the proposed test case to the client machine 110 to allow one of the users 105 (hereinafter, "user B") to verify the test case. For instance, the client machine 110 may display the proposed test case via the GUI at block 112, such as a GUI of an Internet browser. Alternatively, the client machine 110 may generate a file or a document containing the proposed test case, which may be viewed using a document viewing application and/or be transmitted to a printer for printing. Note that user A and user B may or may not be the same person. In some cases, user A and user B are different persons and user A may not have any knowledge of a computer-programming language or script language in which the test case is written in, while user B has some knowledge of the computer-programming language or the script language in order to verify the proposed test case.

As user B verifies the proposed test case at block 140, user B may provide feedback on the proposed test case at block 143. In addition, user B may modify the proposed test case at block 145. In some embodiments, user B may input the feedback and/or the modified test case via a GUI, such as a GUI of an Internet browser. The Internet browser may receive the feedback and/or the modified test case and then may forward the feedback and/or the modified test case to the test case generator 107. At block 135, the test case generator 107 generates a final test case based on the proposed test case and the user feedback, if any, according to one embodiment of the invention. Alternatively, the test case generator 107 may generate a final test case based on the modified test case. In some embodiments, the final test case is written in machine-executable test code.

In some embodiments, the test case generator 107 transmits the final test case to the test case database 150, which stores the final test case. A test server in the test framework 108 may retrieve the final test case from the test case database 150 and may execute the final test case at block 160.

As mentioned above, the error report is in a natural language and the user 105 is not required to have any knowledge of any specific computer-programming language in order to submit the error report. As such, user A does not have to worry about the syntax and/or other nuances of different computer-programming languages, thus, making the error reporting process and the test case generation process described above easy to use. Providing a user-friendly error reporting process may encourage users of the program to report errors, which is important for quality assurance, as well as maintenance and future development of the program. Moreover, the automated test case generation process helps to substantially seamlessly couple the error reporting process to the program testing process, thus making it easier to test the program after revising the program to determine if the error reported has been corrected.

Figure 2:
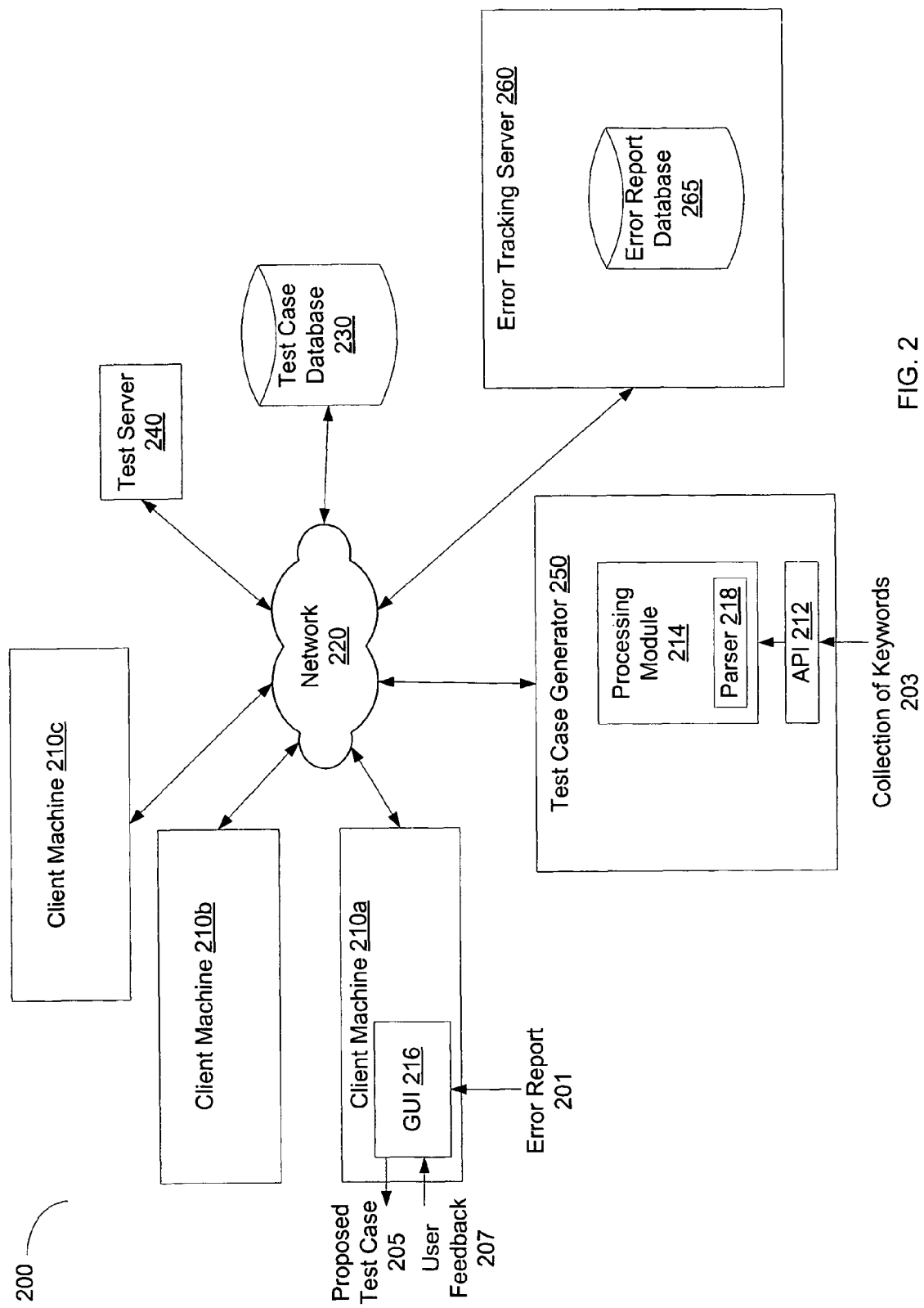
FIG. 2 illustrates one embodiment of a system to automatically generate test cases from error data.

FIG. 2 illustrates one embodiment of a system to automatically generate test cases from error data. The system 200 may include one or more client machines 210a, 210b, and 210c, a network 220, a test case database 230, a test server 240, a test case generator 250, and an error tracking server 260. Some examples of the client machines 210a-210c include desktop personal computers (PCs), laptop PCs, personal digital assistants (PDAs), cellular telephones or mobile telephones, etc. Note that the client machines 210a-210c may be of the same type or of different types in some embodiments. The client machines 210a-210c may be coupled to the network 220 via wired connection, wireless connection, or a combination of both. The network 220 may include various kinds of networks, such as local area network (LAN), wide area network (WAN) (e.g., the Internet), wireless network, wired network, etc. In addition to the client machines 210a-210c, the network 220 is further coupled to the test case database 230, the error tracking server 250, and the test server 240.

The error tracking server 260 may include an error report database 265. The test case generator 250 may include a processing module 214 and an API 212, which are coupled to each other. The processing module 214 may further include a parser 218. The test server 240 may include a test case execution engine 241. The test case generator 250 may be implemented on a server. A server as used herein generally refers to a machine or a computer coupled to a network (e.g., the network 220) to perform one or more predetermined tasks and/or to manage some predetermined resources over the network. The server may include a server front-end responsible for network communication, plug-ins for server functions (such as access control and replication), a basic directory tree containing server-related data, and a database back-end plug-in responsible for managing the storage and retrieval of test case related data in the test case database 230 and/or the error report database 265. In some embodiments, the servers 240, 250, and 260 may be implemented using a single server.

Note that any or all of the components and the associated hardware illustrated in FIG. 2 may be used in various embodiments of the system 200. However, it should be appreciated that other configurations of the system 200 may include more or fewer devices than those shown in FIG. 2.

In the following discussion, the client machine 210a is discussed in detail as an example to illustrate the concept. In some embodiments, the client machine 210a includes a GUI 216. The GUI 216 may receive from a user a report of an error of a program, hereinafter, referred to as the error report. For instance, the GUI 216 may include a form or a template having multiple editable fields for the user to enter data or information of the error in a natural language. For example, the user may enter a description of the error, a set of one or more operations to reproduce the error, an expected result from executing the program, an actual result from executing the program, etc. Further, the GUI 216 may be presented to the user via a network access application, such as an Internet browser. Since the information of the error is in a natural language, thus, the error report is non-programming language specific. Then the client machine 210a may send the error report via the network 220 to the error tracking server 260. The error tracking server 260 may store the error report in the error report database 265. The test case generator 250 may retrieve the error report from the error report database 265, such as by using a query language (e.g., structured query language (SQL), etc.).

In some embodiments, the parser 218 within the processing module 214 in the test case generator 250 parses the error report. For example, a collection of keywords related to some API function calls may be used to translate the natural language in the error report into an automated test case. The automated test case may be written in scripting language to be interpreted for execution or a programming language to be compiled for execution. In one embodiment, the parser 218 finds the keywords in the error report. Then the API 212 creates a set of instruction stubs using the data provided by a tester in the operations to reproduce the error. The data may include files to import, results expected, and instructions to be executed and tested, etc. In another example, the parser 218 scans the error report to find predetermined keywords in the error report. Then the parser 218 may generate an intermediate form of test case, such as the parsed error report in XML in FIG. 3B, based on some predetermined information. For instance, the predetermined information may include a list of primary keywords, such as verbs (e.g., "import," "search," "modify," etc.) and the arguments associated with the primary keywords (e.g., "ldif file" for "import," "search filter" for "search," etc.). In some embodiments, the test case generator 250 may use a default value if no argument is given for a primary keyword found in the error report.

In some embodiments, the API 212 in the error tracking server 250 inputs a collection of predetermined keywords. For instance, the API 212 may import a file containing the collection of keywords. The keywords may be related to specific aspects and/or characteristics of the program, such as "float," "loop," "import," "attached," etc. For example, the processing module 214 may search the raw content of the error report to determine if any of the keywords is in the error report. Based on the keywords found, the processing module 214 may generate a parsed result, which is converted to the proposed test case for reproducing the error. For instance, a set of predetermined instructions and/or inputs may be added to the proposed test case if a predetermined keyword or a predetermined combination of keywords is found in the parsed error report. The proposed test case may be written in a predetermined computer-programming language that is compiled before execution (e.g., C, C++, Java, etc.), or in a predetermined script language that is interpreted as the test case is being executed (e.g., UNIX shell script, perl, python, etc.). Alternatively, the proposed test case may be written in machine-executable test code, such as assembly code, binary code, etc.

In some embodiments, the test case generator 250 sends the proposed test case to the client machine 210a, which outputs the proposed test case to the user to allow the user to verify the test case. For instance, the client machine 210a may display the proposed test case to the user via the GUI 216. Alternatively, the client machine 210a may output the proposed test case into a file or a document printable and/or viewable using a document viewing application (e.g., a file in Portable Document Format (PDF)).

In some embodiments, the user may modify the proposed test case via the GUI 216. For instance, the user may edit the proposed test case via the GUI 216. Alternatively, the user may edit the proposed test case using another application operable on the client machine 210*a*, such as a word processing application (e.g., Microsoft® Word, OpenOffice.org Writer, etc.). The client machine 210*a* may then send the modified test case to the test case generator 250. The test case generator 250 may use the modified test case as the final test case. Alternatively, the test case generator 250 may further process the modified test case to generate a final test case.

In an alternate embodiment, the user inputs feedback 207 to the client machine 210*a* via the GUI 216 as illustrated in FIG. 2. The client machine 210*a* may forward the feedback 207 to the test case generator 250. The test case generator 250 may modify the proposed test case based on the feedback 207 to generate a final test case for reproducing the error reported. The final test case may include machine executable test code.

In some embodiments, the test case generator 250 sends the final test case to the test case database 230 via the network 220. The test case database 230 may store one or more other test cases in addition to the final test case. Then the test server 240 may access the test case database 230 to retrieve the final test case. The test server 240 may execute the final test case to attempt to reproduce the error reported.

In an alternate embodiment, the test case generator 250 provides a GUI to allow a user (e.g., a test case developer) to submit the error report without using the client machines 210*a*-210*c*. Then the test case generator 250 may process the error report as described above to automatically generate a test case to reproduce the error reported.

Figure 4A:
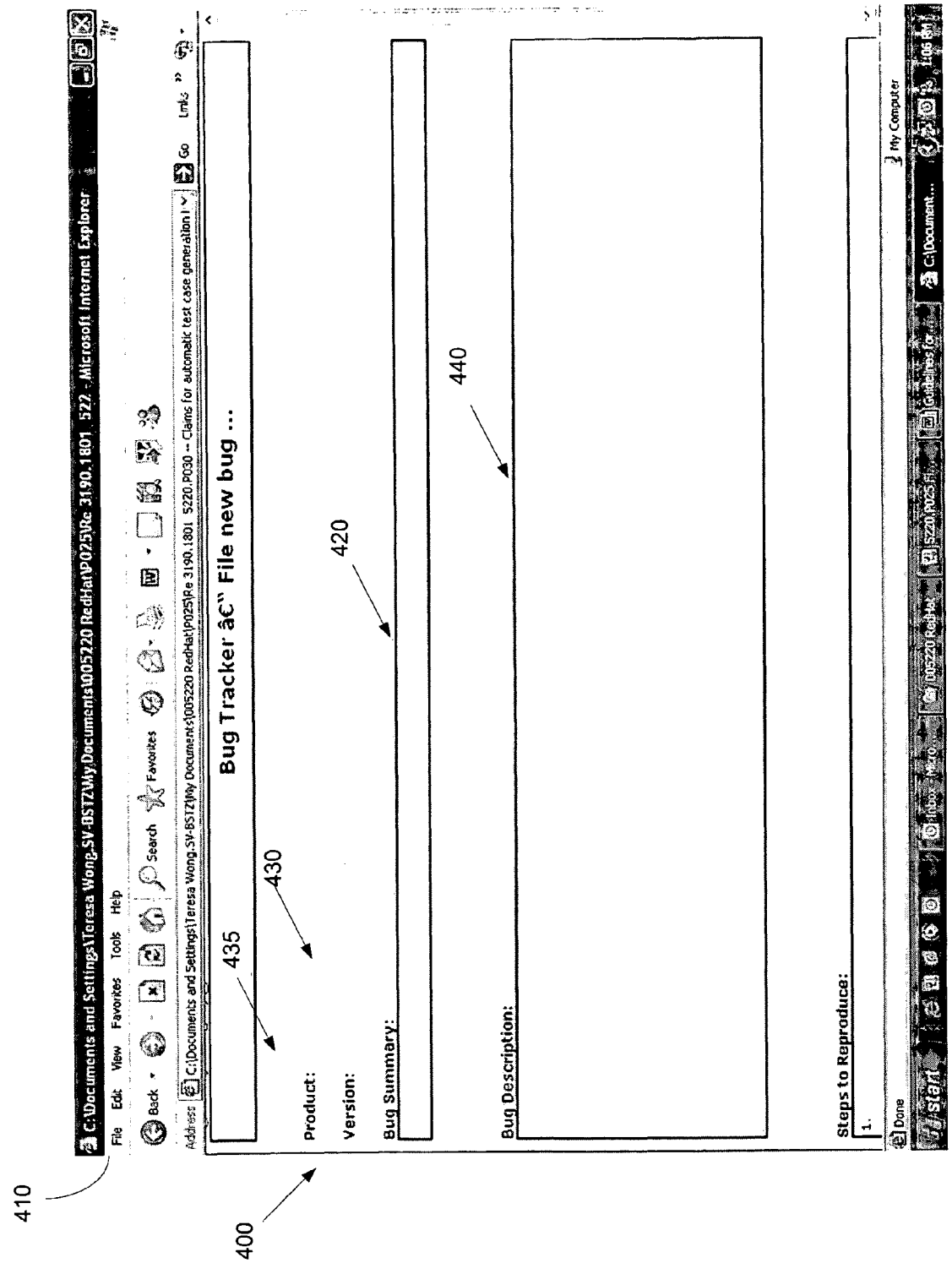
FIGS. 4A-4B illustrate one embodiment of a graphical user interface for a user to input error data.
Figure 4B:
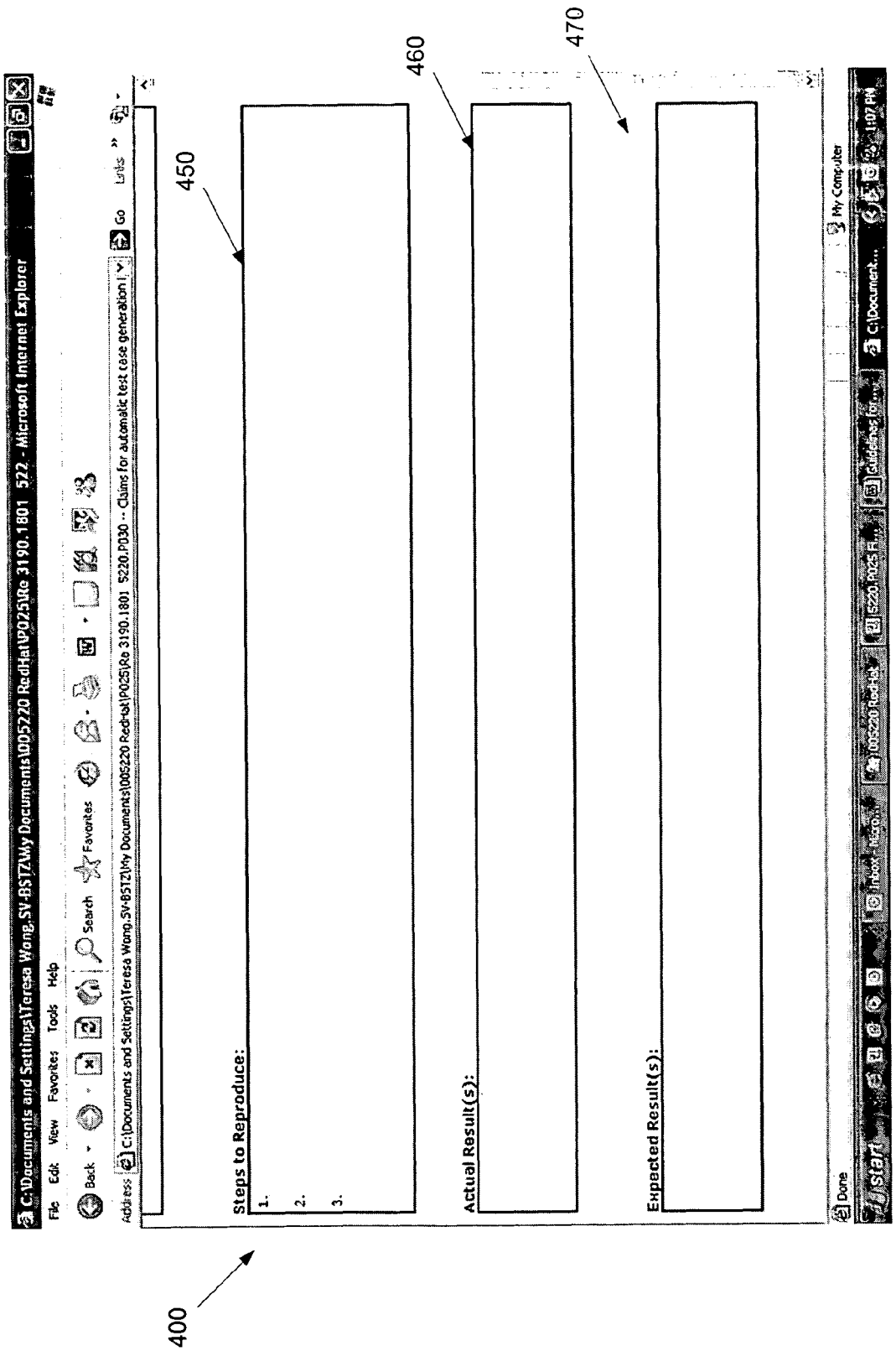

FIGS. 4A-4B illustrate one embodiment of a GUI for a user to input error data. The GUI 400 in FIGS. 4A-4B is presented to a user via an Internet browser 410. However, it should be appreciated that the GUI 400 may not be presented to users via an Internet browser in other embodiments. For example, the GUI 400 may be a standalone object displayed in a separate window in an alternate embodiment.

In some embodiments, the GUI 400 includes a template having multiple editable fields. Referring to FIG. 4A, the GUI 400 includes an editable field 420 to allow the user to enter a summary of the error the user has found. A test case generator (e.g., the test case generator 250 in FIG. 2) may put the summary entered into a test case as a comment. The GUI 400 may further include an editable field 435 to allow the user to enter the name or identifier of the program or the product in which the error is found. Furthermore, the GUI 400 may include an editable field 430 to allow the user to enter a version number of the program or the product in which the error is found. In some embodiments, the GUI 400 further includes an editable field 440 for the user to enter a detailed description of the error or problem the user has encountered. The test case generator may put the description entered into the test case as a comment.

Referring to FIG. 4B, the GUI 400 further includes an editable field 450 to allow the user to enter one or more steps or operations to reproduce the error. The steps or operations to reproduce the error may include one or more predetermined keywords. Further, the GUI 400 may include an editable field 460 to allow the user to enter the actual result of executable the program and another editable field 470 to allow the user to enter the expected result. The test case generator may parse the steps or operations to reproduce the error, the actual result, and the expected result to generate the test case as described above.

As such, the template in the GUI 400 may guide the user to input information about the error in a natural language for composing the error report, which may be submitted via a web page to an error tracking server (e.g., the error tracking server 260 in FIG. 2). The test case generator may retrieve the error report from the error tracking server and may automatically generate a test case having machine-executable code to reproduce the error. Details of some embodiments of the automatic generation of test case have been described above.

Figure 5:
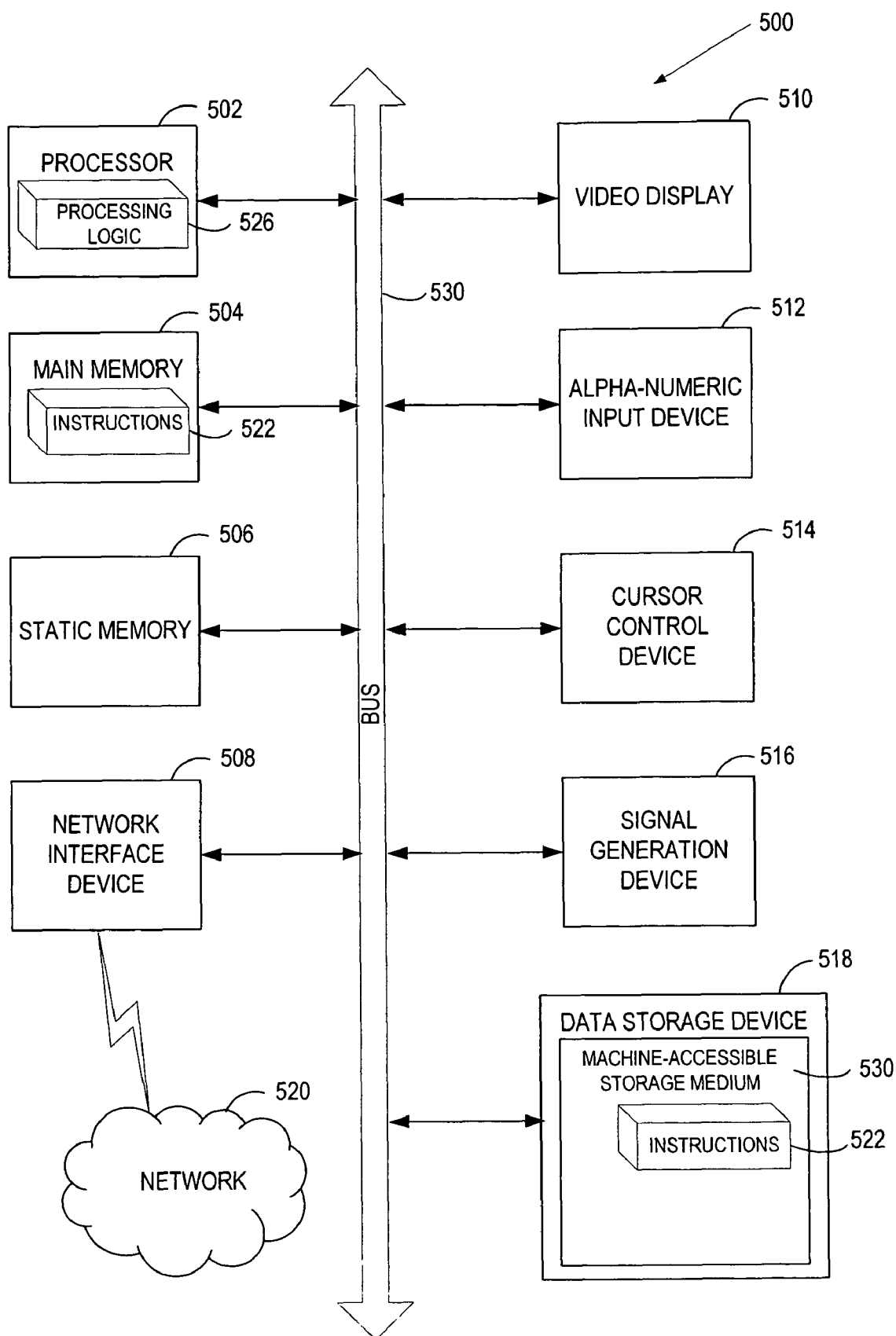
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 (also known as a machine-readable storage medium) on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and apparatus for automatically generating test cases from error data have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising: providing a graphical user interface (GUI) to allow a user to submit a report of an error in a program, the report being partially written in a natural language; receiving the report from the user via the GUI; and processing the report to generate a test case to reproduce the error, said processing comprising parsing content of the report from the user to identify one or more keywords in the natural language in the report, said one or more keywords input by an application programming interface (API), said one or more keywords relating to a plurality of predetermined characteristics of the program, wherein the natural language is for general purpose communication and the report is non-programming language specific, and generating the test case based on the one or more keywords.

2. The method of claim 1, wherein processing the report comprises:
   importing a collection of keywords; and
   searching the report to determine which of the collection of keywords is in the report.

3. The method of claim 1, wherein the test case comprises machine executable test code.

4. The method of claim 1, wherein providing the GUI comprises:
   generating a template to allow the user to input in the natural language at least one of a description of the error, a set of one or more operations to reproduce the error, an expected result from executing the program, and an actual result from executing the program.

5. The method of claim 1, further comprising:
   allowing the user to verify the test case; and
   modifying the test case based on feedback from the user.

6. The method of claim 1, further comprising:
   storing the test case in a database accessible by a test server; and
   executing the test case using the test server.

7. The method of claim 1, wherein the GUI is provided via a client machine and the report is processed at an error tracking server coupled to the client machine.

8. An apparatus comprising: a video display to display a graphical user interface (GUI) to receive a report of an error of a program from a user, the report being partially written in a natural language; and a processor coupled to the video display, to implement a processing module to process the report to generate a test case to reproduce the error, wherein the processing module comprises a parser to parse content of the report from the user to identify one or more keywords in the natural language in the report, said one or more keywords input by an application programming interface (API), said one or more keywords relating to a plurality of predetermined characteristics of the program, wherein the natural language is for general purpose communication and the report is non-programming language specific, and wherein the processing module is operable to generate the test case based on the one or more keywords.

9. The apparatus of claim 8, wherein the processing module is operable to search the report to determine if any of the plurality of keywords is in the report.

10. The apparatus of claim 8, wherein the test case comprises machine executable test code.

11. The apparatus of claim 8, wherein the GUI comprises:
    a template having one or more fields to allow the user to input at least one of a description of the error, a set of one or more operations to reproduce the error, an expected result from executing the program, and an actual result from executing the program.

12. The apparatus of claim 8, wherein the video display further displays:
    a second GUI coupled to the processing module to output the test case to allow the user to verify the test case and to receive feedback from the user, wherein the processing module is operable to modify the test case based on the feedback.

13. The apparatus of claim 8, wherein the video display further displays an Internet browser, through which the GUI is presented to the user.

14. The apparatus of claim 8, further comprising:
    a database to store the test case; and
    a test server coupled to the database to retrieve the test case from the database and to execute the test case.

15. A machine-accessible storage medium that provides instructions that, if executed by a processor, will cause the processor to perform operations comprising: providing a graphical user interface (GUI) to allow a user to submit a report of an error in a program, the report being partially written in a natural language; receiving the report from the user via the GUI; and processing the report to generate a test case to reproduce the error, said processing comprising parsing content of the report from the user to identify one or more keywords in the natural language in the report, said one or more keywords input by an application programming interface (API), said one or more keywords relating to a plurality of predetermined characteristics of the program, wherein the natural language is for general purpose communication and the report is non-programming language specific, and generating the test case based on the one or more keywords.

16. The machine-accessible storage medium of claim 15, wherein processing the report comprises:
    importing a collection of keywords; and
    searching the report to determine which of the collection of keywords is in the report.

17. The machine-accessible storage medium of claim 15, wherein the test case comprises machine executable test code.

18. The machine-accessible storage medium of claim 15, wherein providing the GUI comprises:
    generating a template to allow the user to input in the natural language at least one of a description of the error, a set of one or more operations to reproduce the error, an expected result from executing the program, and an actual result from executing the program.

19. The machine-accessible storage medium of claim 15, wherein the operations further comprise:

allowing the user to verify the test case; and modifying the test case based on feedback from the user.

20. The machine-accessible storage medium of claim 15, wherein the operations further comprise:

storing the test case in a database accessible by a test server; and executing the test case using the test server.

21. The machine-accessible storage medium of claim 15, wherein the GUI is provided via a client machine and the report is processed at an error tracking server coupled to the client machine.

* * * * *